(12) United States Patent
Dejneka et al.

(10) Patent No.: US 6,589,895 B2
(45) Date of Patent: Jul. 8, 2003

(54) THULIUM-DOPED GERMANATE GLASS COMPOSITION AND DEVICE FOR OPTICAL AMPLIFICATION

(75) Inventors: Matthew J. Dejneka, Corning, NY (US); Jean-Philippe de Sandro, Kirkland (CA); Alexandre M. Mayolet, Auneau (FR); Bryce N. Samson, Horseheads, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/897,294

(22) Filed: Jun. 29, 2001

(65) Prior Publication Data

US 2003/0087743 A1 May 8, 2003

(51) Int. Cl.$^7$ .............................. C03C 4/12; C03C 3/23; C03C 3/253; C03C 13/04
(52) U.S. Cl. .............................. 501/42; 501/43; 501/37; 359/341.5; 359/343
(58) Field of Search .............................. 501/37, 42, 43; 359/341.5, 343

(56) References Cited

U.S. PATENT DOCUMENTS

| | | | | |
|---|---|---|---|---|
| 4,999,321 A | * | 3/1991 | Kohli | 501/42 |
| 5,420,080 A | * | 5/1995 | Wang et al. | 501/3 |
| 5,668,659 A | * | 9/1997 | Sakamoto et al. | 359/341.5 |
| 5,786,287 A | * | 7/1998 | Bayya et al. | 501/10 |
| 6,271,160 B1 | * | 8/2001 | Yamamoto et al. | 252/301.4 F |
| 6,413,891 B1 | * | 7/2002 | Cho et al. | 501/41 |

OTHER PUBLICATIONS

J. Y. Allain et al., *Tunable CW Lasing Around 0•82, 1•48, 1•88, and 2•35 μm In Thulium–Doped Fluoriozirconate Fibre*, Electronics Letters, Nov. 23, 1989, pp. 1660–1662, vol. 25–No. 24.

S. Bayya et al., $BaO$–$Ga_2O_3$–$GeO_2$ *glasses with enhanced properties*, Journal of Non–Crystalline Solids, 1997, pp. 198–207, vol. 212, Elsevier Science B.V.

D. A. Chapman, *Erbium–doped fibre amplifiers: the latest revolution in optical communications*, Electronics & Communication Engineering Journal, Apr. 1994, pp. 59–67, vol. 6–No. 2, IEE.

J. Heo et al., *Spectroscopic analysis of $Tm_{3+}$ in $PbO$–$Bi_2O_3$–$Ga_2O_3$ glass*, Applied Optics, Jul. 20, 1995, pp. 4284–4289, vol. 34–No. 21.

(List continued on next page.)

*Primary Examiner*—David Sample
(74) *Attorney, Agent, or Firm*—Foley & Lardner

(57) ABSTRACT

A Tm-doped germanate glass composition comprises $GeO_2$ having a concentration of at least 20 mole percent, $Tm_2O_3$ having a concentration of about 0.001 mole percent to about 2 mole percent, and $Ga_2O_3$, having a concentration of about 2 mole percent to about 40 mole percent. The composition can further include an alkaline earth metal compound selected from the group consisting of MgO, CaO, SrO, BaO, $BaF_2$, $MgF_2$, $CaF_2$, $SrF_2$, $BaCl_2$, $MgCl_2$, $CaCl_2$, $SrCl_2$, $BaBr_2$, $MgBr_2$, $CaBr_2$, $SrBr_2$, and combinations thereof, and having a non-zero concentration of less than about 40 mole percent. The composition can further include an alkali metal compound selected from the group consisting of $Li_2O$, $Na_2O$, $K_2O$, $Rb_2O$, $Cs_2O$, $Li_2F_2$, $Na_2F_2$, $K_2F_2$, $Rb_2F_2$, $Cs_2F_2$, $Li_2Cl_2$, $Na_2Cl_2$, $K_2Cl_2$, $Rb_2Cl_2$, $Cs_2Cl_2$, $Li_2Br_2$, $Na_2Br_2$, $K_2Br_2$, $Rb_2Br_2$, $Cs_2Br_2$ and combinations thereof, and having a non-zero concentration of less than about 20 mole percent. The emission bandwidth of the composition in the 1450 nm to 1530 nm range can be varied on the basis of one or more composition ratios. A Tm-doped germanate optical amplifier can amplify optical signals in the S-band region of the electromagnetic spectrum.

29 Claims, 9 Drawing Sheets

OTHER PUBLICATIONS

P. L. Higby et al., *Properties of barium gallium germanate glasses*, Journal of Non–Crystalline Solids, 1993, pp. 303–308, vol. 163, North Holland.

J. M. Jewell et al., *Properties of BaO–$R_2O_3$–$Ga_2O_3$$GeO_2$ (R=Y, Al, La, and Gd) Glasses*, Journal of the American Ceramic Society, Mar. 1994, pp. 697–700, vol. 77–No. 3.

M. Krishnan Murthy et al., *Some Physical Properties of Alkali Germanate Glasses*, Nature, Jan. 18, 1964, pp. 285–286, vol. 201–No. 4916.

M. K. Murthy et al., *Properties and structure of glasses in the system $M_2O$–$Ga_2O_3$–$GeO_2$ (M=Li, Na, K)*, Physics and Chemistry of Glasses, Feb. 1, 1967, pp. 26–29, vol. 8–No. 1.

T. Sakamoto et al., *1.4-µm–Band Gain Characteristics of a Tm–Ho–Doped ZBLYAN Fiber Amplifier Pumped in the 0.8-µm Band*, IEEE Photonics Technology Letters, Sep. 9, 1995, pp. 983–985, vol. 7–No. 9.

* cited by examiner

THULIUM-DOPED GERMANATE GLASS COMPOSITION AND DEVICE FOR OPTICAL AMPLIFICATION

BACKGROUND OF THE INVENTION

1. Field of the Invention

This invention generally relates to the field of glass compositions and devices for optical amplification.

2. Description of the Related Art

In optical telecommunications networks, high bandwidth is desired for applications such as the Internet, video on demand, and videophone. In many optical communications systems, optical signals having wavelengths in the range 1530–1560 nanometers (nm) are utilized. This wavelength range corresponds to the "C-band" in telecommunications. This wavelength range also corresponds to a minimum attenuation region for silica and silica-based fibers.

Optical amplifiers are utilized to amplify the optical signals in those wavelength regions. Conventional optical amplifiers for telecommunications include erbium (Er)-doped silicate glass. The Er-doped silicate glass optical amplifier operates in the C-band and can also amplify optical signals in the 1570 nm–1620 nm range (also referred to as the L-band).

The ever-increasing demand for bandwidth has filled the erbium C-band, and is beginning to fill the L-band. In order to increase optical bandwidth, more wavelengths will need to be transmitted. One wavelength range of interest is the 1460 nm–1530 nm wavelength band, often referred to as the "S-band." However, this wavelength band is outside of the Er-based material amplification range.

Within the 1460 nm–1530 nm wavelength band, trivalent thulium ($Tm^{3+}$) has an emission band centered at about 1470 nm. As shown in the $Tm^{3+}$ energy diagram of FIG. 1, the $^3H_4$—$^3F_4$ transition in $Tm^{3+}$ corresponds to an emission at about 1470 nm. In order to generate a population in the $^3H_4$ energy level, for example, 790 nm radiation is absorbed by the $Tm^{3+}$ material, whereby ions are transferred to the $^3H_4$ excited state from the $^3H_6$ ground state.

Most Tm-doped silicate glasses have an excited state lifetime (for the $^3H_4$ level) of less than 100 microseconds, due to the quenching of the upper level in silicate hosts. This short lifetime is less preferable for laser and amplification applications. Similarly, other $Tm^{3+}$ hosts, such as phosphate glass and borate glass, are also less preferable because $Tm^{3+}$ is quenched by the high phonon energy of these glasses as well.

An increased $^3H_4$ excited state lifetime can be obtained with a Tm-doped host fluoride glass material, such as fluorozirconate or ZBLAN ($57ZrF_4$-$20BaF_2$-$4LaF_3$-$3AlF_3$-$20NaF$). The measured lifetime for the $^3H_4$ excited state lifetime in ZBLAN is about 1.5 milliseconds. While laser action and optical amplification have been previously demonstrated in Tm-doped ZBLAN, this material is not advantageous for mass-produced optical amplifier applications because of the difficulties of processing fluoride glasses, the low glass transition temperature, and the less than desirable chemical durability of fluoride glasses, which suffer from deleterious effects when exposed to moisture. In addition, the emission linewidth in ZBLAN is narrow, limiting the bandwith of the amplifier.

Thus, there remains a need for optical amplifiers that operate in the 1460 nm–1530 mu wavelength band.

SUMMARY OF THE INVENTION

In view of the foregoing, according to one embodiment of the present invention, a composition comprises $GeO_2$ having a concentration of at least 20 mole percent, $Tm_2O_3$ having a concentration of about 0.001 mole percent to about 2 mole percent, and $Ga_2O_3$, having a concentration of about 2 mole percent to about 40 mole percent. The composition can further include an alkaline earth metal compound selected from the group consisting of MgO, CaO, SrO, BaO, $BaF_2$, $MgF_2$, $CaF_2$, $SrF_2$, $BaCl_2$, $MgCl_2$, $CaCl_2$, $SrCl_2$, $BaBr_2$, $MgBr_2$, $CaBr_2$, $SrBr_2$, and combinations thereof, and having a non-zero concentration of less than about 40 mole percent. The composition can further include an alkali metal compound selected from the group consisting of $Li_2O$, $Na_2O$, $K_2O$, $Rb_2O$, $Cs_2O$, $Li_2F_2$, $Na_2F_2$, $K_2F_2$, $Rb_2F_2$, $Cs_2F_2$, $Li_2Cl_2$, $Na_2Cl_2$, $K_2Cl_2$, $Rb_2Cl_2$, $Cs_2Cl_2$, $Li_2Br_2$, $Na_2Br_2$, $K_2Br_2$, $Rb_2Br_2$, $Cs_2Br_2$ and combinations thereof, and having a non-zero concentration of less than about 20 mole percent. The emission bandwidth and lineshape of the composition in the 1450 nm to 1530 nm range can be varied on the basis of one or more composition ratios and/or other parameters.

According to another embodiment of the present invention, an optical amplification device comprises a germanate glass material doped with $Tm^{3+}$. The germanate glass material has a first surface configured to receive an optical signal having a wavelength of from about 1460 nm to about 1540 nm and a second surface configured to output an amplified optical signal. The germanate glass material can have the composition described above. The emission bandwidth of the germanate glass material can be varied based on the composition of the material. The germanate glass material can be configured as a core for an optical fiber. The optical amplification device can further include a pump source for producing an excited $^3H_4$ state in $Tm^{3+}$.

Other advantages and novel features of the present invention will become apparent from the following detailed description of the invention when considered in conjunction with the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

DETAILED DESCRIPTION OF THE PREFERRED EMBODIMENTS

Figure 1:
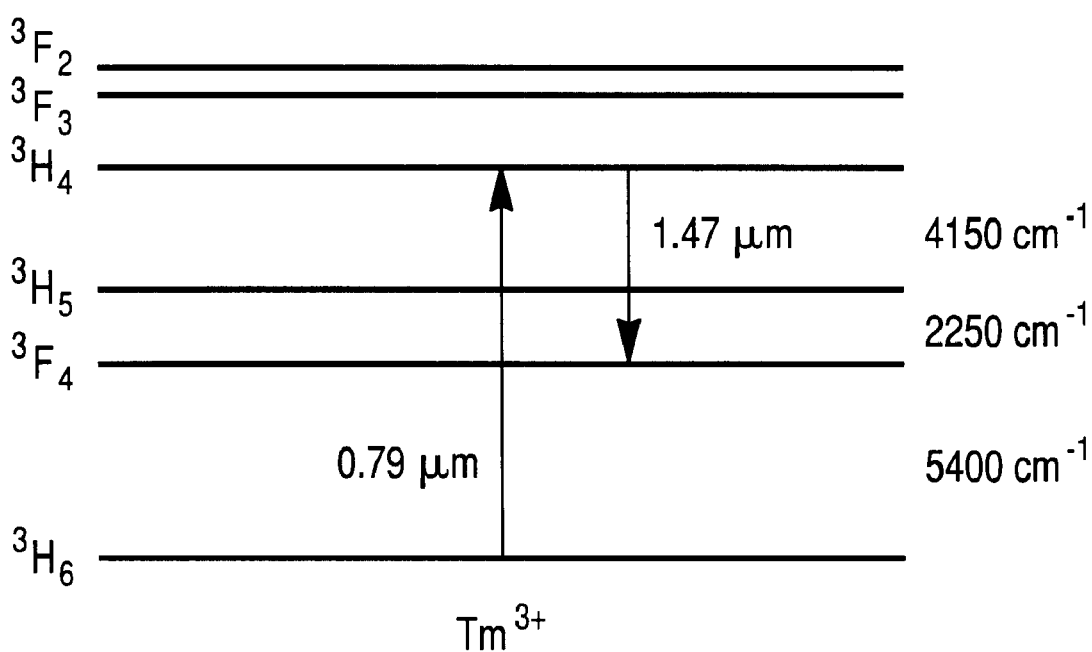
FIG. 1 shows an energy level diagram for $Tm^{3+}$.

The present invention is related to a Tm-doped germanate glass composition that can be utilized as a wide band optical amplifier in the 1460 nm–1530 nm wavelength band.

The inventors have determined that germanate glasses can act as a host material for $Tm^{3+}$. The Tm-doped germanate glass material has acceptable low phonon energy characteristics, good chemical durability, and can be processed in a straightforward manner. In addition, the inventors have determined that the 1460 nm–1530 nm wavelength emission shape can be both controlled and maximized in particular wavelength regions depending on the specific composition of the germanate glass.

According to a first embodiment of the present invention, a host material for Tm-doping is provided. The host material is a germanate-based glass having a $GeO_2$ glass former and an oxide compound such as $Ga_2O_3$, or the like, that can provide added chemical durability. $Ga_2O_3$ is preferable in a concentration of about 2 mole % to about 40 mole %, with a concentration of about 10 mole % to about 18 mole % being preferred. By "about" it is meant within + or –1.0%.

The $Tm^{3+}$ ion can be introduced into the germanate glass composition as a particular concentration of $Tm_2O_3$ (or a thulium halide, such as $TmF_3$, $TmCl_3$, and the like). The $Tm^{3+}$ dopant concentration can be from about 0.001 mole % to about 2 mole %, with a preferred concentration being from about 0.05 mole % to about 0.1 mole %. For example, acceptable results can occur for $Tm^{3+}$ concentrations of about 0.05 mole % (i.e., 0.16 weight %). Acceptable results can also occur for $Tm^{3+}$ concentrations of about 0.5 weight %.

One or more of the following groups of materials can also be incorporated into the germanate host material. First, alkaline earth metal compounds can be included. For example, the alkaline earth metal compounds can include BaO, MgO, CaO, SrO, and/or $BaF_2$, $MgF_2$, $CaF_2$, $SrF_2$ and/or $BaCl_2$, $MgCl_2$, $CaCl_2$, $SrCl_2$, and/or $BaBr_2$, $MgBr_2$, $CaBr_2$, $SrBr_2$, or combinations thereof. The alkaline earth compounds can help provide better chemical durability and glass stability for the germanate host. In addition, the alkaline earth fluorides can help increase the lifetime of the $Tm^{3+}$ emission, which can increase the efficiency of optical amplification. Further, alkaline earth metal halides such as, for example, $BaCl_2$, $CaCl_2$ and $CaBr_2$ can act as drying agents to strip out —OH during the melting process. For use herein, AO is a general alkaline earth metal oxide, and $AX_2$ is a general alkaline earth metal halide.

Second, alkali oxide compounds can be included in the germanate host. These alkali oxide compounds can include, for example, $Li_2O$, $Na_2O$, $K_2O$, $Rb_2O$, $Cs_2O$, $Li_2F_2$, $Na_2F_2$, $K_2F_2$, $Rb_2F_2$, $Cs_2F_2$, $Li_2Cl_2$, $Na_2Cl_2$, $K_2Cl_2$, $Rb_2Cl_2$, $Cs_2Cl_2$, $Li_2Br_2$, $Na_2Br_2$, $K_2Br_2$, Rb2Br2, and $Cs_2Br_2$, and combinations thereof. One or more of these compounds can be incorporated to provide glass melting stability and gain shaping. Further, alkali metal halides such as, for example, $Na_2F_2$, $K_2Cl_2$, and $Rb_2Br_2$ can act as drying agents to strip out —OH during the melting process. For use herein, $Z_2O$ is a general alkali metal oxide, and $Z_2X_2$ is a general alkali metal halide. The halides are represented as $Z_2X_2$ so that they have the same stoichiometry as the oxide. The person of skill in the art will recognize that $Z_2X_2$ is chemically identical to ZX; for example, $Na_2Cl_2$ is sodium chloride.

Third, intermediate elements and compounds (e.g., $Ta_2O_5$, $La_2O_3$, $Nb_2O_5$, $Al_2O_3$, $Sb_2O_3$, $As_2O_3$, and $CeO_2$) can be included. For example, $Ta_2O_5$ and $Nb_2O_5$ can be incorporated in sufficient amounts to increase the index of refraction of the germanate host material. $Al_2O_3$ can be incorporated in suitable amounts to increase durability, and/or to decrease the germanate host index of refraction, if used in appropriate amounts. $Sb_2O_3$, $As_2O_3$, and/or $CeO_2$ can be incorporated in the germanate glass host as refining agents to help remove bubbles from the glass during formation. They can also be used to control the oxidation state of polyvalent compounds in the glass.

Fourth, heavy metal oxides and compounds (e.g., PbO and/or $Bi_2O_3$) can be incorporated into the germanate host material. One or more of these compounds can be incorporated into the composition to provide increased glass stability, a modified refractive index, and/or gain shaping.

Figure 9:
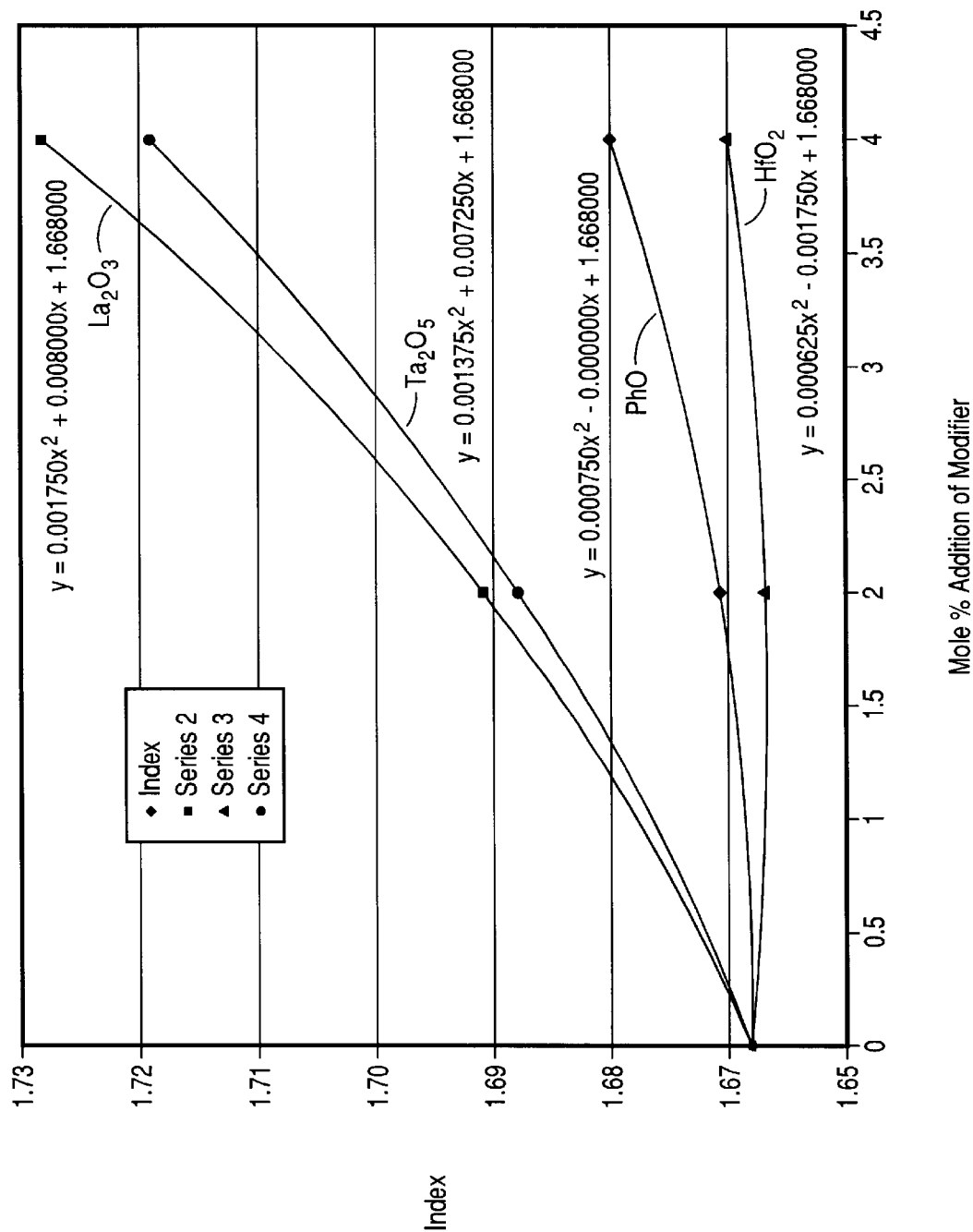
FIG. 9 shows a plot of index of refraction versus modifier concentration for several different modifiers to the germanate composition.

Other materials such as $RE_2O_3$ (where RE represents all rare earth elements, such as La, Nd, Pr, Er, Y, Yb, Er, Sm, Gd, Lu, etc.), ZnO, $TiO_2$, $ZrO_2$, and $HfO_2$ can be incorporated in germanate host for various other purposes. For example, $La_2O_3$, $Gd_2O_3$, $Y_2O_3$, and $Lu_2O_3$ are transparent at the wavelength of interest and can help reduce $Tm^{3+}$ clustering. Also, compounds such as $La_2O_3$, $Ta_2O_3$, PbO, and $HfO_2$, as shown in FIG. 9, as well as other compounds such as $Al_2O_3$ and similar materials can be incorporated in differing amounts, depending on the desired index of refraction of the germanate material to control refractive index without modifying the $Tm^{3+}$ spectroscopy, which can be controlled by compositional parameters, such as $R_1$ (defined below). With these particular modifier compounds, increased concentrations can lead to an increased (or in some cases, decreased) index of refraction. As the person of skill in the art will appreciate, these compounds may also be incorporated as the corresponding halide.

In particular, the germanate glass material of a preferred embodiment can include one or more variations of the following composition: $GeO_2+Ga_2O_3+Tm_2O_3+$(AO or $AX_2$) and/or ($Z_2O$ or $Z_2X_2$)+(optionally) one or more intermediate compounds, where A can be an alkaline earth metal such as Mg, Ca, Sr, or Ba, and Z can be an alkali metal such as Li, Na, K, Rb, or Cs. This composition provides a low phonon energy host for the $Tm^{3+}$ ion. In addition, chemical durability and gain shape can be improved over a fluoride-based material such as ZBLAN. Moreover, the lifetime of the $^3H_4$—$^3F_4$ transition can be over 5 times greater than that demonstrated in Tm-doped silicate materials.

Table I shows a first preferred range of concentrations of the aforementioned germanale glass composition constituents.

TABLE I

Composition Concentrations

| Component | Concentration Ranges, including preferable and preferred ranges (in mole percent) |
|---|---|
| $TmO_3$ | $0.001\% \leq Tm_2O_3 \leq 2\%$ (preferable), |
|  | $0.05\% \leq Tm_2O_3 \leq 0.1\%$ (preferred) |
| $GeO_2$ | $GeO_2 \geq 20\%$, |
|  | $50\% \leq GeO_2 \leq 90\%$ (preferable), |
|  | $65\% \leq GeO_2 \leq 75\%$ (preferred) |
| $SiO_2$ | $SiO_2 \leq 40\%$ |
| $SiO_2 + GeO_2$ | $40\% \leq SiO_2 + GeO_2 \leq 80\%$ |
| ZnO | $0\% \leq ZnO \leq 40\%$ (preferable), |
|  | $0\% \leq ZnO \leq 5\%$ (preferred) |
| PbO | $0\% \leq PbO \leq 50\%$ (preferable), |
|  | $0\% \leq PbO \leq 10\%$ (preferred) |
| $Bi_2O_3$ | $0\% \leq Bi_2O_3 \leq 50\%$ |
| $PbO + Bi_2O_3$ | $0\% \leq PbO + Bi_2O_3 \leq 60\%$ |
| $Ga_2O_3$ | $Ga_2O_3 \geq 2\%$, |
|  | $2\% \leq Ga_2O_3 \leq 40\%$ (preferable), |
|  | $10\% \leq Ga_2O_3 \leq 18\%$ (preferred) |

TABLE I-continued

Composition Concentrations

| Component | Concentration Ranges, including preferable and preferred ranges (in mole percent) |
|---|---|
| $Al_2O_3$ | $0\% \leq Al_2O_3 < 20\%$ (preferable), |
|  | $0\% \leq Al_2O_3 < 1\%$ (preferred) |
| $Ta_2O_5, Nb_2O_5$ | $0\% \leq Ta_2O_5 \leq 20\%$, |
|  | $0\% \leq Nb_2O_5 \leq 10\%$ (preferable), |
|  | $0\% \leq Ta_2O_5 \leq 2\%$ (preferred), |
|  | $0\% \leq Nb_2O_5$ (preferred) |
| $Sb_2O_3$ | $0\% \leq Sb_2O_3 \leq 5\%$ (preferable), |
|  | $0\% \leq Sb_2O_3 \leq 1\%$ (preferred) |
| $As_2O_3$ | $0\% \leq As_2O_3 \leq 5\%$ (preferable), |
|  | $0\% \leq As_2O_3 \leq 1\%$ (preferred) |
| $CeO_2$ | $0\% \leq CeO_2 \leq 5\%$ (preferable), |
|  | $0\% \leq CeO_2 \leq 2\%$ (preferred) |
| $RE_2O_3$ | $0\% \leq RE_2O_3 \leq 15\%$ (preferable), |
|  | $0\% \leq RE_2O_3 \leq 1\%$ (preferred) |
| $AX_2 + Z_2X_2$ | $0\% \leq AX_2 + Z_2X_2 \leq 10\%$ (preferable), |
|  | $0.1\% \leq AX_2 + Z_2X_2 \leq 4\%$ (preferred) |
| $TiO_2 + ZrO_2 +$ | $0\% \leq TiO_2 + ZrO_2 + HfO_2 \leq 10\%$ (preferable), |
| $HfO_2$ | $0\% \leq TiO_2 + ZrO_2 + HfO_2 \leq$ (preferred) |
| $AO + AX_2$ | $0\% \leq AO + AX_2 \leq 40\%$ (preferable), |
|  | 7%–14% (preferred AO + $AX_2$), |
|  | 0–1% (preferred MgO), |
|  | 4%–10% (preferred CaO), |
|  | 0–5% (preferred SrO), |
|  | 2%–7% (preferred BaO) |
| $Z_2O + Z_2X_2$ | $0\% \leq AO + AX_2 \leq 20\%$ (preferable), |
|  | 4%–6% (preferred AO + $AX_2$), |
|  | 0% (preferred $Li_2O$), |
|  | 0% (preferred $Na_2O$), |
|  | 2%–6% (preferred $K_2O$), |
|  | 2%–4% (preferred $Rb_2O$), |
|  | 2%–4% (preferred $Cs_2O$) |
| $(AO + AX_2 + Z_2O +$ | $0.4 \leq R_1 \leq 2.5$ (no units) (preferable), |
| $Z_2X_2)/(Ga_2O_3 +$ | $0.8 \leq R_1 \leq 1.25$ (no units) (preferred) |
| $Al_2O_3) = R_1$ |  |
| $(AO + AX_2)/(Z_2O +$ | Any ratio (preferable), |
| $Z_2X_2) = R_2$ | $1.8 \leq R_2 \leq 2.25$ (no units) (preferred) |

The above germanate composition can be varied according to a number of parameters.

As the inventors have determined, pure $GeO_2$ has a very low $Tm^{3+}$ solubility (<0.25 mole %) and can lead to clustering and poor $Tm^{3+}$ efficiency. As described herein, alkali germanate glasses demonstrate a broad $Tm^{3+}$ emission (150 nm FWHM), but the spectra can be extremely peaked and the durability of the host glass is poor.

Figure 2:
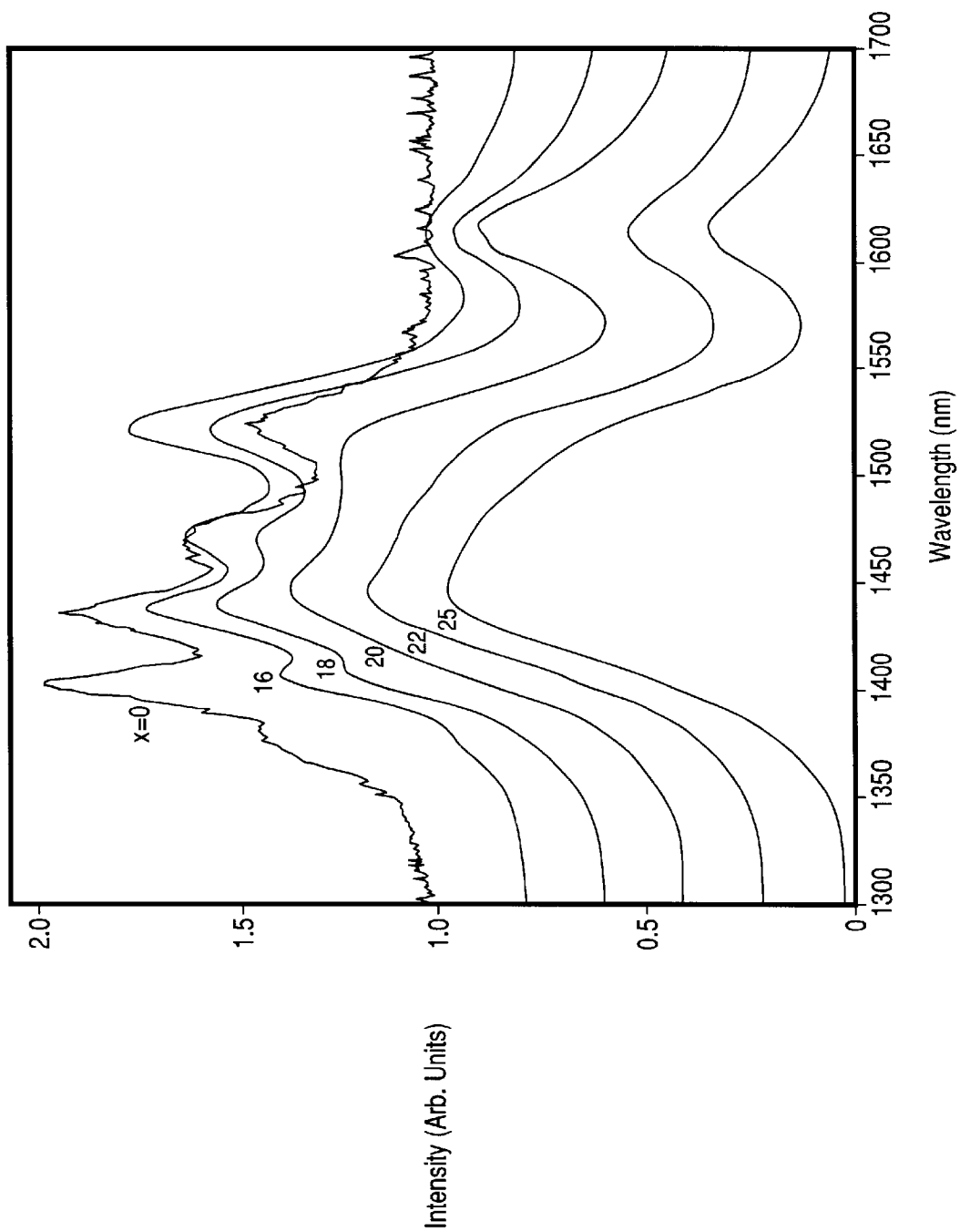
FIG. 2 shows a plot of the emission spectra for several Tm-doped germanate glasses having varying concentrations of $Ga_2O_3$ in mole %.

For example, FIG. 2 shows the emission spectra for several Tm-doped germanate glasses having varying concentrations of $Ga_2O_3$. The emission spectra were taken under conventional techniques, where the Tm-doped germanate sample was irradiated at about 800 nm, and emission was detected with an infrared detector. A ¼-meter monochromator was used to provide spectral resolution.

In particular, the following germanate composition was used in FIG. 2: $60GeO_2+XXGa_2O_3+(40-XX)K_2O$, where XX represents the mole % of $Ga_2O_3$ incorporated in the germante host material. In these spectra, 0.05 mole % $Tm_2O_3$ was used. By adding $Ga_2O_3$ to an alkali or alkaline earth germanate, the glass becomes more stable, more durable, and, as shown in FIG. 2, the emission spectrum becomes much flatter and more desirable. The glass stability and durability can also be further enhanced by using an appropriate mixture of alkali and alkaline earth modifiers. The preferred germanate glass compositions have an alkaline earth metal to alkali metal ratio ($R_2$ from Table I) of about 2.0. Alkaline earth germanates have good durability as compared to their alkali counterparts, and these optimized mixtures are acceptable in comparison to alkaline earth end members, and have improved glass stability for fiber drawing.

Figure 3:
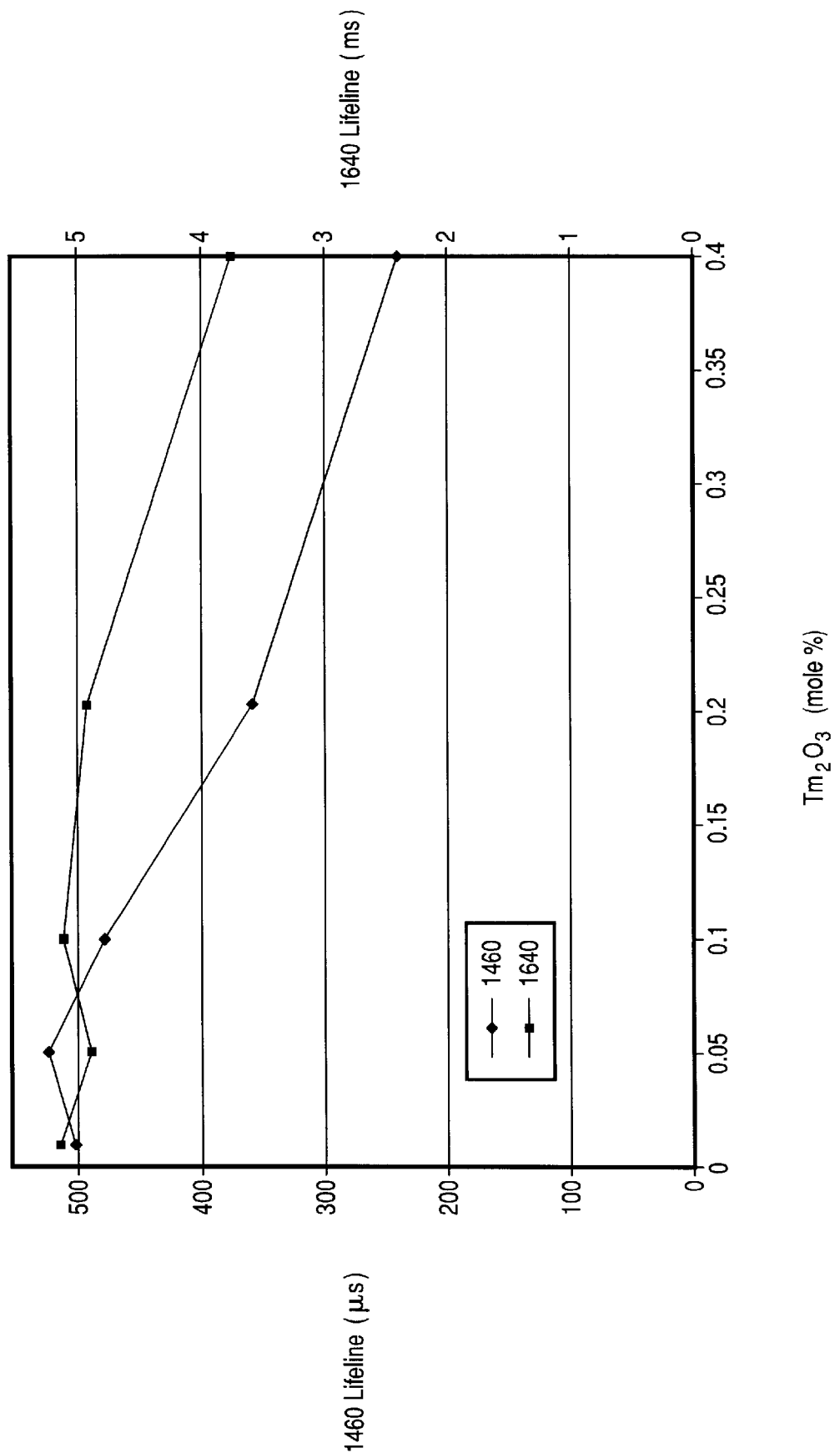
FIG. 3 shows a plot of the lifetime of the $Tm^{3+}$ $^3H_4$ and $^3F_4$ levels as a function of $Tm_2O_3$ concentration.

The $Tm^{3+}$ concentration in the host material can also be varied. FIG. 3 shows that at concentrations above 0.1 mole %, the 1460 nm (i.e., $Tm^{3+}$ $^3H_4$ level) lifetime begins to decrease, indicating that non-radiative relaxation begins to occur at greater concentrations, which can decrease amplifier efficiency. The $Tm^{3+}$ $^3F_4$ level is also quenched above 0.1% as shown in FIG. 3. The tradeoff to consider in optimization is that it is desirable to put as much $Tm_2O_3$ in the glass as possible without sacrificing efficiency, so shorter fiber lengths can be used to minimize the passive loss and noise figure of the amplifier. Thus, a preferred $Tm_2O_3$ concentration is between about 0.05 mole % to about 0.1 mole %.

Figure 4:
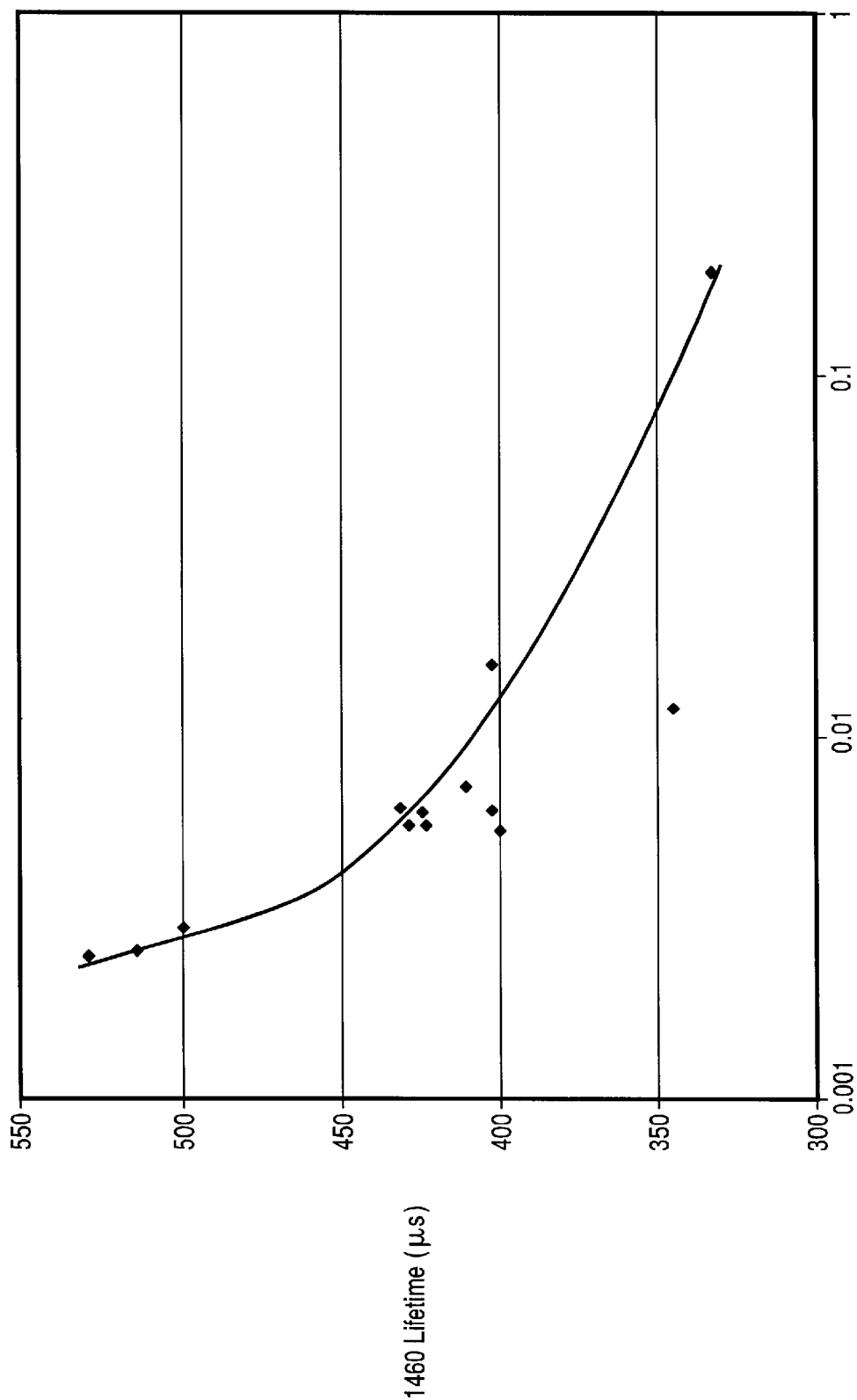
FIG. 4 shows a plot of the lifetime of the $Tm^{3+}$ $^3H_4$ upper level as a function of β-OH.

Another parameter that can be controlled is the water content (or β-OH) of the germanate glass. OH ligands have a high frequency vibrational mode that can couple to excited $Tm^{3+}$ ions and quench them. FIG. 4 shows the effect of β-OH on the $Tm^{3+}$ $^3H_4$ lifetime. $Tm^{3+}$ efficiency was maintained by having the glasses dried through compositional and processing innovations. For example, glass batches can be calcined at 300° C. for 2 hours under dry flowing $O_2$ and then slowly heated at 65° C./hr. under flowing $O_2$ to thermally devolve absorbed water and flush it away before it has a chance to react with the batch materials, or get trapped in the melt. In this manner, most of the water can be removed before any melt is formed. The addition of chlorides and fluorides to the batch help to remove OH as HCl and/or HF respectively at high temperatures after the melt has formed. Two mole % $BaCl_2$ and 2 mole % $CaF_2$ were found to be preferred levels for effective drying. This combination of processing and composition reduces the β-OH of the glass by a factor of 50 over conventional melting techniques and can consequently increase the $Tm^{3+}$ lifetime by about 30%, from 330 µs to 430 µs. The addition of more fluoride can cause a further increase in lifetime (at constant β-OH) up to 520 µs, but the tradeoff of fluorescence linewidth and glass stability should be considered.

Other parameters that can be varied to produce a desired emission bandwidth are various composition ratios. As listed in Table 1, a first composition ratio $R_1$ is defined as $R_1=AX_2+Z_2O+Z_2X_2)/(Ga_2O_3+Al_2O_3)$. This ratio can provide a measure of non-bonding oxygens in the glass material.

A preferable range for $R_1$ is from about 0.4 to about 2.5, with a preferred range being from about 0.8 to about 1.25. For example, when $R_1=1$, the glass network is fully polymerized and viscosity and durability are maximized. As $R_1$ becomes greater than 1, the number of non-bonding oxygens increases, viscosity decreases and the emission spectrum breaks up into many peaks, as illustrated in FIG. 2.

As listed in Table I, a second composition ratio is $R_2$, which is defined as $R_2=(AO+AX_2)/(Z_2O+Z_2X_2)$. Again, $AF_2$ can be substituted for AO and/or ZF for $Z_2O$, if desired. While any $R_2$ ratio is acceptable, a range of from about 1.8 to about 2.25 is preferred.

In addition, the above ratios can be modified when intermediate elements are used, in the manner apparent to those of skill in the art.

According to a preferred embodiment of the present invention, the emission bandwidth of the $Tm^{3+}$ $^3H_4$—$^3F_4$ transition can be maximized depending on the $R_1$ value and/or on the presence or absence of the forming metal oxide (such as PbO, $Bi_2O_3$) in the germanate composition for a given $R_1$ value.

Figure 5:
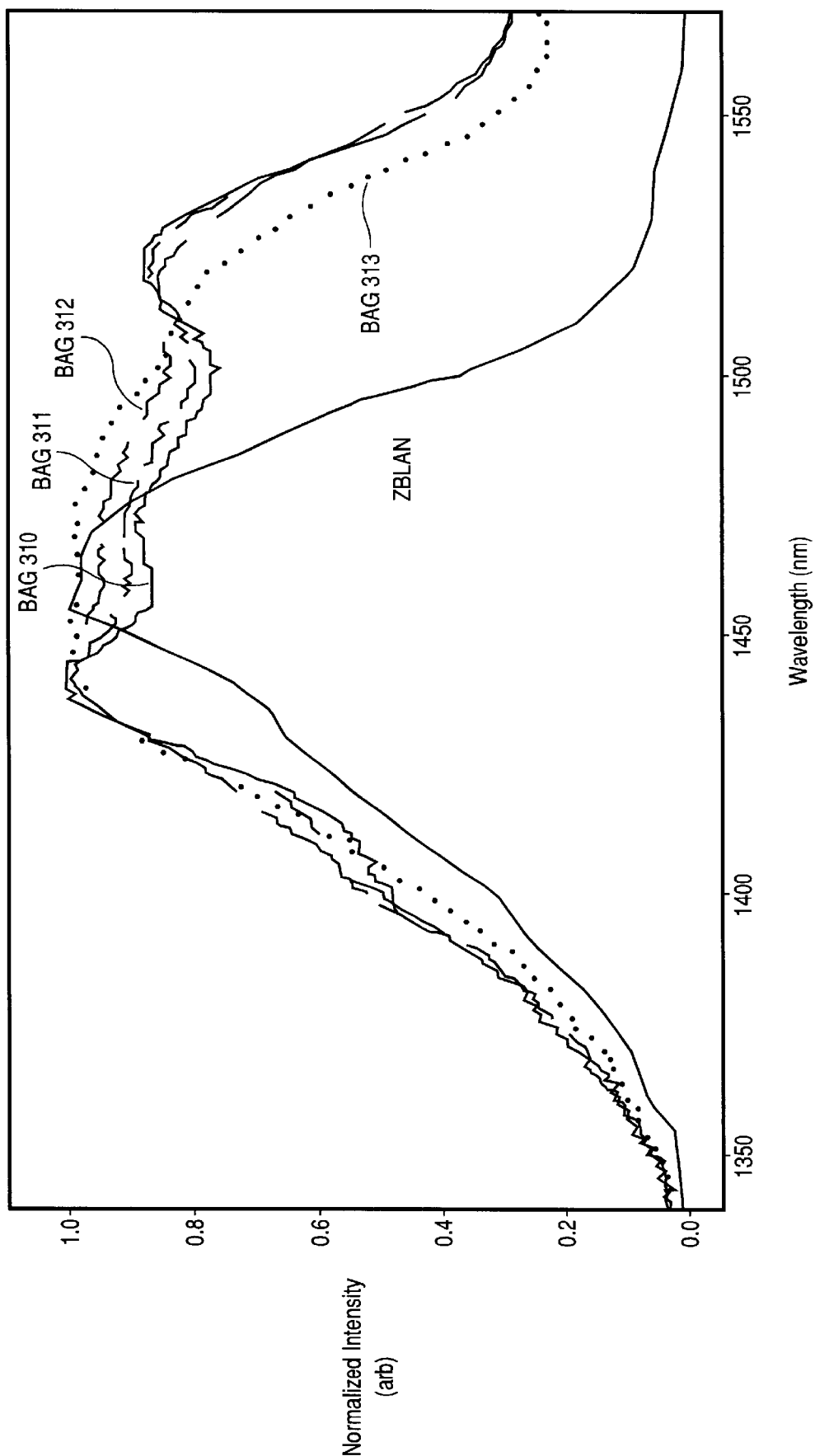
FIG. 5 shows an emission spectra for several Tm-doped germanate glass material samples according to an embodiment of the invention.

For example, FIG. 5 shows a plot of the fluorescence (or emission) spectra for several different germanate glass compositions formed in accordance with a composition of an embodiment of the present invention. In this example, $R_1$ values are set at $R_1 \geq 1$ and the sample compositions do not include any heavy metal compounds, such as PbO and $Bi_2O_3$. Also shown in FIG. 2 is the transmission spectra for a $Tm^{3+}$ ZBLAN glass material as a comparison. The sample germanate glass compositions used to produce the spectra shown in FIG. 5 are presented below in Table II.

TABLE II

Sample Compositions for FIG. 5

| Constituent | Concentration CA | Concentration CB | Concentration CC | Concentration CD |
|---|---|---|---|---|
| $GeO_2$(mole %) | 60 | 60 | 60 | 60 |
| $Ga_2O_3$(mole %) | 8 | 12 | 16 | 20 |
| BaO(mole %) | 30 | 26 | 22 | 18 |
| $BaF_2$(mole %) | 2 | 2 | 2 | 2 |
| $Tm_2O_3$(wt. %) | 0.5 | 0.5 | 0.5 | 0.5 |
| $R_1$ | 4 | 2.333 | 1.5 | 1 |

In this example, $R_1$ is determined by the ratio $(BaO+BaF_2)/(Ga_2O_3)$ in accordance with the definition provided previously. Alternatively, other intermediate compositions including compounds such as $Al_2O_3$ and $Ta_2O_5$ and/or heavy metals such as PbO and $Bi_2O_3$ can be used. In addition, $Tm^{3+}$ was introduced into each of the samples through a $Tm_2O_3$ compound, having a concentration of about 0.5% (by weight). The emission spectra were measured in the manner described above with respect to FIG. 2.

FIG. 5 shows a substantial broadening in emission bandwidth (as a function of wavelength) for the $Tm^{3+}$ doped germanate compositions of the present invention. On the shorter wavelength side, for $1 \leq R_1 \leq 4$, a peak emission at about 1440 nm is shown. On the longer wavelength side, a second peak at about 1525 nm is shown for $1.5 \leq R_1 \leq 4$. The spectra show that for each of the germanate compositions, the emission band width is about 140 nm–150 nm measured at full width at half maximum (FWHM). The inventive glasses show a much stronger fluorescence in the desirable 1480–1520 nm portion of the spectrum, relative to ZBLAN.

Figure 6:
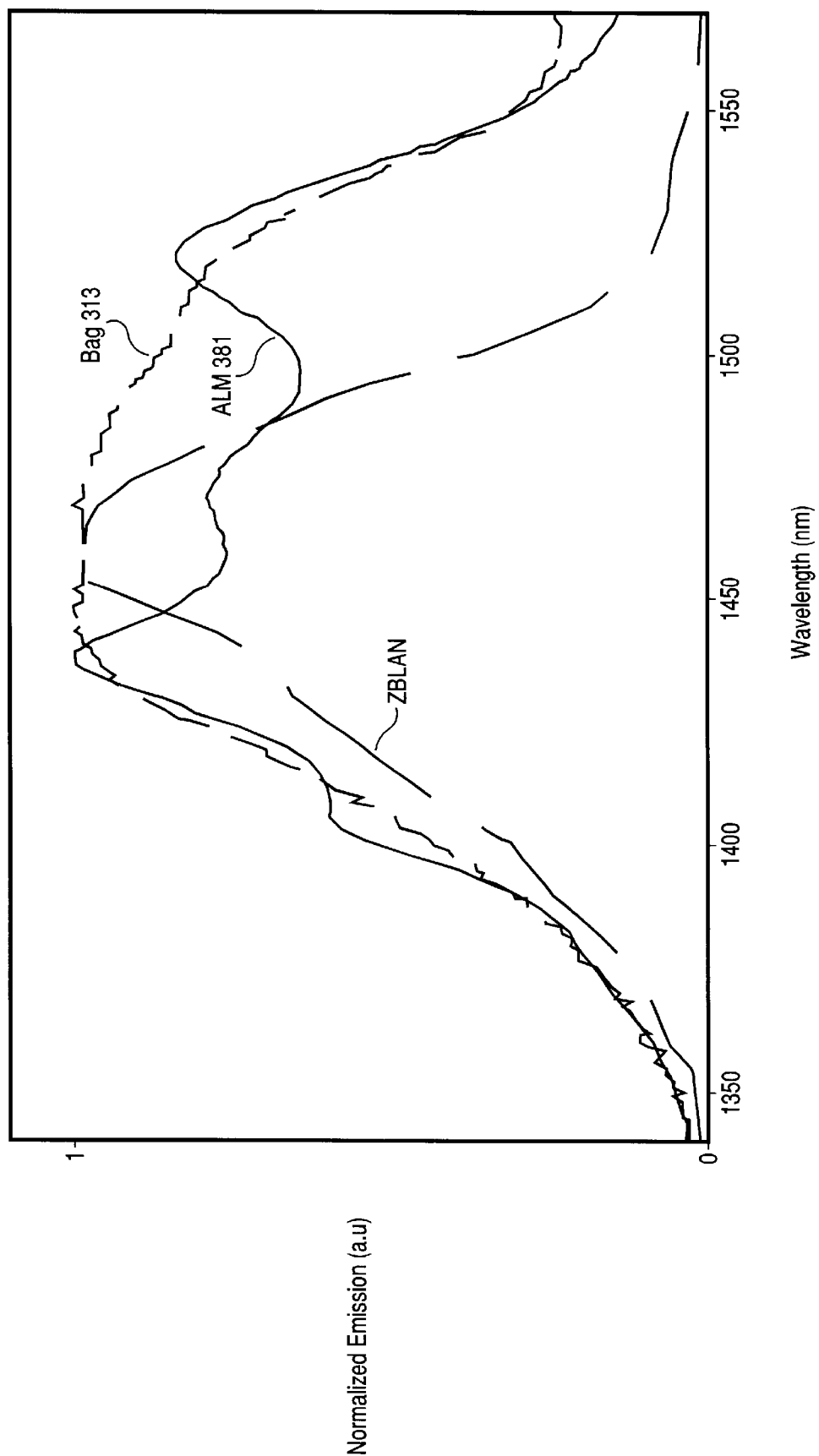
FIG. 6 shows an emission spectra for a Tm-doped germanate glass material samples according to another embodiment of the invention.

According to yet another embodiment of the present invention, the Tm-doped germanate glass composition can include heavy metal glass forming oxides such as PbO and $Bi_2O_3$. For example, the germanate glass composition sample CX included: $GeO_2$ (45 mole %), $SiO_2$ (5 mole %), PbO (45 mole %), $K_2O$ (10 mole %), and $Tm_2O_3$ (0.5 weight %). FIG. 6 shows a plot of the emission spectra for sample CX, as well as for a $Tm^{3+}$ ZBLAN glass material and a sample of glass composition CD as comparisons. The emission spectra were measured in accordance with the experimental conditions described previously with respect to FIG. 5. The results from FIG. 6 show a similar broadening of the $Tm^{3+}$ emission spectrum as was shown in FIG. 2 as compared to the ZBLAN sample. In addition, FIG. 6 shows a stronger peak for sample CE at 1525 nm as compared to sample CD, a reduced emission from about 1450 nm to about 1500 nm for CX as compared to CD, and increased emission peaks at about 1440 nm and at about 1400 nm for CX as compared to CD.

In addition to the above mentioned parameters, the amount of heavy modifier elements (e.g., BaO) in the germanate composition can be varied. Also, the amount of intermediate elements (e.g., $Ta_2O_5$, $La_2O_3$, and $Ga_2O_3$) in the germanate composition can be varied. Further, the amount of glass forming heavy metal oxides (e.g., PbO and $Bi_2O_3$) in the germanate composition can be varied.

Overall, FIGS. 2–6 demonstrate that the concentrations of the components of the germanate glass composition can be modified to provide a tailored emission shape over a broad emission spectra extending from about 1400 nm to about 1540 nm. Thus, the germanate glass compositions can be utilized for wide-band optical amplification in this extended wavelength range.

In accordance with the Tm-doped germanate glass compositions described above, many variations of component concentrations were tested and samples produced. The following Tables III–IX list component concentrations for example glasses which are suitable for waveguide applications, including slab amplifiers and fiber amplifiers. The variations listed include samples DD-OV. Sample OM is a preferred composition. The samples denoted by ** indicate unstable glass.

The glasses were made as follows. The constituent raw material powders (e.g., the oxides, chlorides, bromides, nitrates, and/or carbonates) are weighed and mixed to form a batch for the desired composition. As the person of skill in the art will appreciate, the alkali metal oxides and the alkaline earth metal oxides may be added as the corresponding carbonates or nitrates. The batch can then be placed in a refractory crucible, such as $SiO_2$ (or, e.g., platinum, $Al_2O_3$, and the like) and calcined at 300° C. to drive off physically absorbed water. The batch is then further heated to a melting temperature of 1350° C., to allow the batch materials to react and form a melt. Halogens (e.g., F, Cl, and Br) react with hydroxyl groups at these temperatures and form volatile HF, HCl, and/or HBr which further dries the glass melt, and also strips out deleterious transition metals. Once the melt is formed, it can be transferred to a Pt crucible to prevent siliceous cord from the $SiO_2$ crucible. The melt can be stirred and the temperature can be lowered to about 1150° C. to condition the melt for forming. Other methods of forming these glasses will be apparent to those of ordinary skill in the art given the present description.

TABLE III

Samples DD–DL

| Glass | DD | DE | DF** | DG | DH | DJ** | DK | DL |
|---|---|---|---|---|---|---|---|---|
| $GeO_2$ | 60 | 60 | 40 | 60 | 80 | 60 | 60 | 60 |
| $K_2Cl_2$ | 2 | 0 | 0 | 0 | 0 | 0 | 2 | 2 |
| $K_2O$ | 38 | 0 | 0 | 0 | 0 | 0 | 20 | 28 |
| $Cs_2O$ | 0 | 40 | 0 | 0 | 0 | 0 | 0 | 0 |
| PbO | 0 | 0 | 58 | 38 | 0 | 0 | 0 | 0 |
| $PbCl_2$ | 0 | 0 | 2 | 2 | 0 | 0 | 0 | 0 |
| $Bi_2O_3$ | 0 | 0 | 0 | 0 | 20 | 0 | 0 | 0 |
| $Nb_2O_5$ | 0 | 0 | 0 | 0 | 0 | 0 | 10 | 0 |
| $Ga_2O_3$ | 0 | 0 | 0 | 0 | 0 | 0 | 0 | 10 |
| BaO | 0 | 0 | 0 | 0 | 0 | 38 | 0 | 0 |
| $BaCl_2$ | 0 | 0 | 0 | 0 | 0 | 2 | 0 | 0 |
| $Tm_2O_3$ | 0.1 | 0.1 | 0.1 | 0.1 | 0.1 | 0.1 | 0.1 | 0.1 |

TABLE IV

Samples DM–DU

| Glass | DM | DN | DO** | DP | DQ | DR | DS | DT | DU |
|---|---|---|---|---|---|---|---|---|---|
| $GeO_2$ | 60 | 60 | 40 | 60 | 60 | 60 | 60 | 60 | 60 |
| $K_2O$ | 23 | 18 | 13 | 8 | 18 | 28 | 8 | 13 | 18 |
| $K_2Cl_2$ | 1 | 1 | 1 | 1 | 1 | 1 | 1 | 1 | 1 |
| $K_2Br_2$ | 1 | 1 | 1 | 1 | 1 | 1 | 1 | 1 | 1 |
| $Ga_2O_3$ | 15 | 20 | 25 | 0 | 0 | 0 | 10 | 10 | 10 |
| BaO | 0 | 0 | 0 | 30 | 20 | 10 | 20 | 15 | 10 |
| $Tm_2O_3$ | 0.1 | 0.1 | 0.1 | 0.1 | 0.1 | 0.1 | 0.1 | 0.1 | 0.1 |

TABLE V

Samples DV–EJ

| Glass | DV | DW | DX | DY | DZ | EA | EB | EC | ED | EE | EF | EG | EH | EI | EJ** |
|---|---|---|---|---|---|---|---|---|---|---|---|---|---|---|---|
| $GeO_2$ | 60 | 60 | 60 | 50 | 70 | 55 | 55 | 60 | 60 | 60 | 60 | 60 | 60 | 60 | 60 |
| $K_2O$ | 22 | 20 | 16 | 23 | 13 | 8 | 13 | 12 | 12 | | | | | | |
| $K_2Cl_2$ | 1 | 1 | 1 | 1 | 1 | 1 | 1 | 1 | 1 | | | | | | |
| $K_2Br_2$ | 1 | 1 | 1 | 1 | 1 | 1 | 1 | 1 | 1 | | | | | | |
| $Ga_2O_3$ | 16 | 18 | 22 | 25 | 15 | 0 | 0 | 16 | 16 | 16 | 18 | 22 | 18 | 18 | 22 |
| PbO | 0 | 0 | 0 | 0 | 0 | 15 | 10 | 10 | 0 | | | | 24 | 22 | 16 |
| BaO | 0 | 0 | 0 | 0 | 0 | 10 | 10 | 0 | 0 | 24 | 22 | 16 | | | |
| ZnO | 0 | 0 | 0 | 0 | 0 | 10 | 10 | 0 | 10 | | | | | | |
| $Tm_2O_3$ | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

TABLE VI

Samples ID–IK

| Glass | ID | IE | IF | IG | IH | II | IJ | IK | IM |
|---|---|---|---|---|---|---|---|---|---|
| $GeO_2$ | 70 | 70 | 70 | 70 | 70 | 70 | 70 | 70 | 70 |
| $Ga_2O_3$ | 14 | 14 | 14 | 14 | 14 | 14 | 7 | 0 | 14 |
| $Al_2O_3$ | 0 | 0 | 0 | 0 | 0 | 0 | 7 | 14 | 0 |
| BaO | 0.67 | 0 | 4.67 | 1.56 | 2.67 | 2.67 | 2.67 | 2.67 | 0.67 |
| $BaCl_2$ | 2 | 0 | 2 | 2 | 2 | 2 | 2 | 2 | 2 |
| CaO | 8 | 10.7 | 0 | 3.56 | 5 | 5.5 | 6 | 6 | 8 |
| MgO | 0 | 0 | 4 | 3.55 | 0 | 0 | 0 | 0 | 0 |
| ZnO | 0 | 0 | 0 | 0 | 1 | 0.5 | 0 | 0 | 0 |
| $K_2O$ | 2.67 | 2.67 | 2.67 | 2.67 | 2.67 | 2.67 | 2.67 | 2.67 | 5.33 |
| $Rb_2O$ | 2.66 | 2.66 | 2.66 | 2.66 | 2.66 | 2.66 | 2.66 | 2.66 | 0 |
| $CeO_2$ | 0.25 | 0.25 | 0.25 | 0.25 | 0.25 | 0.25 | 0.25 | 0.25 | 0 |
| $Tm_2O_3$ | 0.1 | 0.1 | 0.1 | 0.1 | 0.1 | 0.1 | 0.1 | 0.1 | 0.05 |

TABLE VII

Samples KX–LF

| Glass | KX | KY | KZ | LA | LB | LC | LD | LE | LF |
|---|---|---|---|---|---|---|---|---|---|
| $GeO_2$ | 70 | 70 | 70 | 70 | 70 | 70 | 70 | 70 | 70 |
| $Ga_2O_3$ | 14 | 14 | 14 | 14 | 14 | 14 | 14 | 14 | 14 |
| BaO | 2.67 | 2.67 | 2.67 | 2.67 | 2.67 | 2.67 | 2.67 | 2.67 | 2.67 |
| $CaF_2$ | 4 | 4 | 4 | 4 | 4 | 4 | 4 | 4 | 4 |
| CaO | 4 | 4 | 4 | 4 | 4 | 4 | 4 | 4 | 4 |
| $K_2O$ | 2.67 | 2.67 | 2.67 | 2.67 | 2.67 | 2.67 | 2.67 | 2.67 | 2.67 |
| $Rb_2O$ | 2.66 | 2.66 | 2.66 | 2.66 | 2.66 | 2.66 | 2.66 | 2.66 | 2.66 |
| $CeO_2$ | 0.05 | 0.05 | 0.05 | 0.05 | 0.05 | 0.01 | 0.25 | 0.5 | 1 |
| $Tm_2O_3$ | 0.01 | 0.05 | 0.1 | 0.2 | 0.4 | 0.05 | 0.05 | 0.05 | 0.05 |

TABLE VIII

Samples HW–JM

| Glass | HW | JE | JF | JG | JH | JI | JJ | JK | JL | JM |
|---|---|---|---|---|---|---|---|---|---|---|
| $GeO_2$ | 70 | 70 | 70 | 70 | 70 | 70 | 70 | 70 | 70 | 70 |
| $Ga_2O_3$ | 14 | 14 | 14 | 14 | 14 | 14 | 14 | 14 | 14 | 14 |
| $Al_2O_3$ | 0 | 0 | 0 | 0 | 0 | 0 | 0 | 0 | 0 | 0 |
| BaO | 8.67 | 2.67 | 2.67 | 2.67 | 2.67 | 2.67 | 2.67 | 2.67 | 2.67 | 2.67 |
| $BaCl_2$ | 2 | 2 | 2 | 2 | 2 | 2 | 2 | 2 | 2 | 2 |
| CaO | 0 | 6 | 4 | 2 | 6 | 6 | 6 | 6 | 6 | 6 |
| $CaF_2$ | 0 | 0 | 0 | 0 | 0 | 0 | 0 | 0 | 0 | 0 |
| $K_2O$ | 2.67 | 2.67 | 2.67 | 2.67 | 2.67 | 2.67 | 2.67 | 2.67 | 2.67 | 2.67 |
| $Rb_2O$ | 2.66 | 2.66 | 2.66 | 2.66 | 2.66 | 2.66 | 2.66 | 2.66 | 2.66 | 2.66 |
| $CeO_2$ | 0.25 | 0.25 | 0.25 | 0.25 | 0.25 | 0.25 | 0.25 | 0.25 | 0.25 | 0.25 |
| PbO | 0 | 0 | 2 | 4 | 0 | 0 | 0 | 0 | 0 | 0 |
| $La_2O_3$ | 0 | 0 | 0 | 0 | 2 | 4 | 0 | 0 | 0 | 0 |
| $HfO_2$ | 0 | 0 | 0 | 0 | 0 | 0 | 2 | 4 | 0 | 0 |
| $Ta_2O_5$ | 0 | 0 | 0 | 0 | 0 | 0 | 0 | 0 | 2 | 4 |
| $Tm_2O_3$ | 0.1 | 0.1 | 0.1 | 0.1 | 0.1 | 0.1 | 0.1 | 0.1 | 0.1 | 0.1 |
| Index | N/A | 1.668 | 1.671 | 1.68 | 1.691 | 1.728 | 1.667 | 1.671 | 1.688 | 1.719 |

TABLE IX

| | | | Samples OM–OV | | | |
|---|---|---|---|---|---|---|
| Glass | OM | OR | OS | OT | OU** | OV** |
| GeO$_2$ | 70 | 70 | 70 | 70 | 70 | 70 |
| Ga$_2$O$_3$ | 14 | 10 | 12 | 15 | 18 | 20 |
| BaO | 0 | 1.34 | 1.00 | 0.50 | 0 | 0 |
| BaCl$_2$ | 2.67 | 2 | 2 | 2 | 2 | 1.67 |
| CaO | 6 | 8 | 7 | 5.5 | 4.0 | 3.0 |
| CaF$_2$ | 2 | 2 | 2 | 2 | 2 | 2 |
| K$_2$O | 2.67 | 3.33 | 3.0 | 2.5 | 2.0 | 1.67 |
| Rb$_2$O | 2.66 | 3.33 | 3.0 | 2.5 | 2.0 | 1.66 |
| Tm$_2$O$_3$ | 0.05 | 0.05 | 0.05 | 0.05 | 0.05 | 0.05 |

Figure 10:
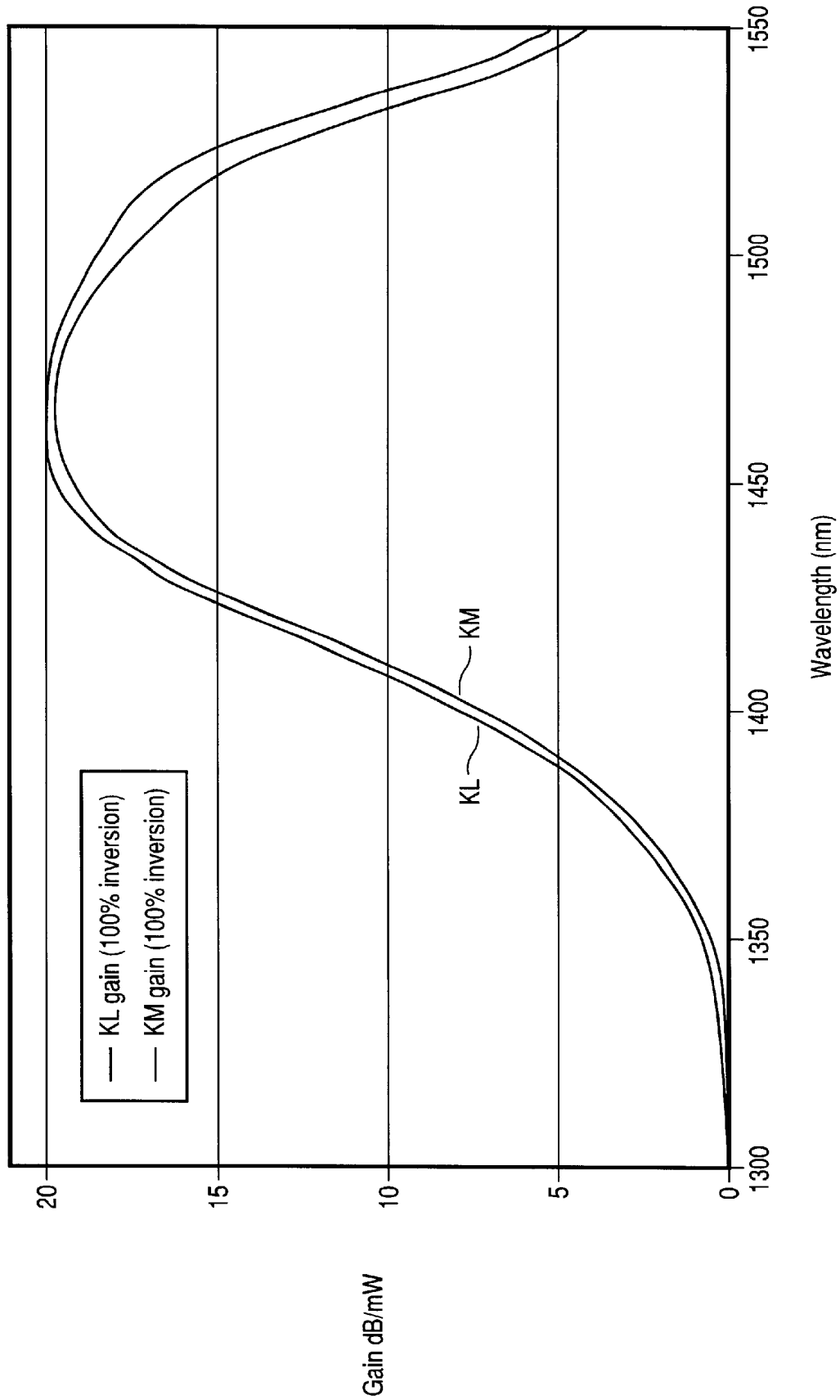
FIG. 10 shows gain curves over the infrared wavelength region for two germanate compositions.

According to another embodiment of the present invention, an optical amplifier is provided. The optical amplifier includes a Tm-doped germanate glass host. The optical amplifier amplifies optical signals within the wavelength range of about 1450 nm to about 1530 nm, preferably about 1480 nm to about 1530 nm. For example, FIG. 10 shows gain curves as a function of wavelength for samples KL and KM. Here, gain is measured in dB/mW. Similar gain curves can be measured and used to optimize the peak amplification wavelength region and length of the optical amplifier.

Figure 7:
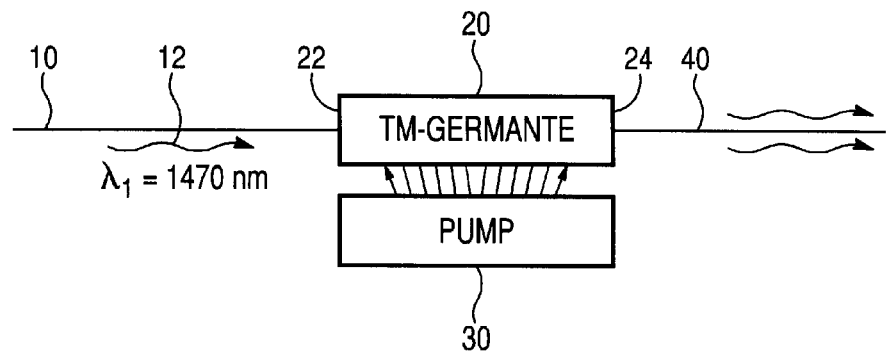
FIG. 7 shows a Tm-doped germanate glass material optical amplifier according to another embodiment of the invention.
Figure 8A:
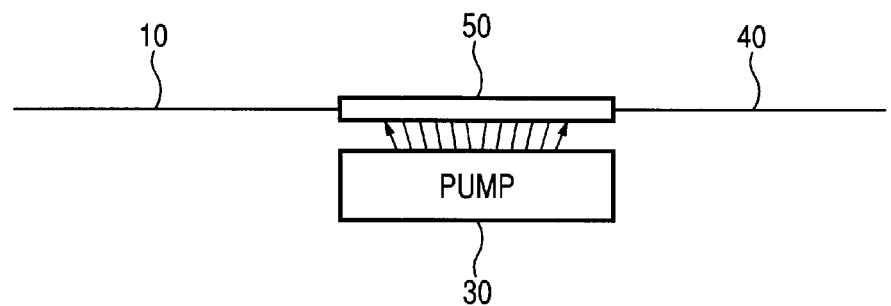
FIGS. 8A and 8B show Tm-doped germanate glass fiber according to an alternative embodiment of the invention.
Figure 8B:
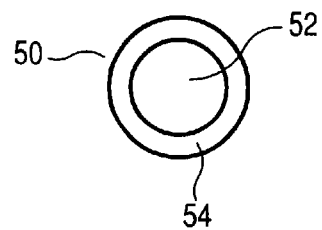

FIG. 7 shows a schematic diagram of the optical amplifier 20. An input optical fiber 10 carries an optical signal 12 having a wavelength of about 1450 nm to about 1530 nm. In this example, optical signal 12 has a wavelength of about 1470 nm. Fiber 10 and output fiber 20 can be conventional silica-based optical fibers. The optical signal 12 is amplified by an optical amplifier 20. Optical amplifier 20 includes an input surface 22 and an output surface 24. Optical amplification can be achieved over the wavelength range of interest using a Tm-doped germanate glass material, having a composition in accordance with the parameters described above. For example, optical amplifier 20 can comprise a germanate glass material having the same composition as samples KY, OM, or CD, described previously, which exhibit a wideband emission at about 1450 nm to about 1530 nm. Alternatively, a germanate glass material having a different composition can be utilized, in accordance with the parameters described above. The germanate glass material can be in the form of a glass slab (as is shown in FIG. 7) with polished input and output surfaces 22, 24 to reduce spurious reflections. Alternatively, the germanate glass material can be used as the core material of an optical fiber amplifier 50, as is shown in FIGS. 8A and 8B. Input fiber 10 and output fiber 40 can be optically coupled to amplifier 20 using conventional fiber coupling techniques, as would be apparent to one of skill in the art given the present description.

In addition, the optical amplifier 20 is optically pumped by a pump source 30, such as a conventional laser diode (or other laser or lamp) operating in the 780 nm–800 nm wavelength region. Alternatively, an infrared Raman laser (or the like) can be used to pump both the $^3H_6$—$^3F_4$ and the $^3F_4$—$^3H_4$ absorption bands simultaneously, in order to prevent possible deleterious up-conversion effects created when strongly pumping at 790 nm. Of course, any of a number of pumping schemes can be utilized so that the Tm-doped germanate glass material can efficiently absorb light from the pump source 30, depending on the particular absorption characteristics of the Tm-doped germanate glass material, as will be apparent to one of skill in the art given the present description. Accordingly, at least a portion of the light from pump source 30 is absorbed by the Tm-doped germanate glass material in amplifier 20 in order to produce a population of Tm$^{3+}$ ions in the $^3H_4$ excited state. Optical amplification occurs through stimulated emission as is known. As a result, the optical signal 12 is amplified and the amplified signal is output along output fiber 40. The length of amplifier 20 and the Tm concentration can be modified depending on the overall requirements of an optical system or network that amplifier 20 is incorporated.

As mentioned previously, the Tm-doped germanate glass material can be incorporated into an amplifying fiber, such as fiber 50 as is shown in FIGS. 8A and 8B. In FIG. 8A, an input fiber 10 carrying an optical signal is coupled by conventional techniques to amplifying fiber 50, which is further coupled on the output to output fiber 40. A pump 30 can be used to produce an excited state population in fiber 50 using conventional fiber pumping techniques. As shown in FIG. 8B, amplifying fiber 50 has a core 52 which includes the Tm-doped germanate glass material described previously. The Tm-doped germanate glass material can be drawn into fiber form using conventional fiber drawing techniques. Fiber 50 also includes a cladding material 54, which can include an inner clad and an outer clad. The cladding material should be suitably indexed and can comprise a suitable conventional cladding material. Alternatively, the cladding material can be a borosilicate glass, as described in the commonly held and copending U.S. Patent application by Dejneka et al. entitled "Borosilicate Cladding Glasses for Germanate Core Thulium-Doped Amplifiers," which is incorporated herein by reference. An examplary borosilicate glass composition may be made from a composition having 45 mole % SiO$_2$, 5 mole % Al$_2$O$_3$, 13.5 mole % BaO, 2 mole % BaCl$_2$, 5.5 mole % CaO, 2 mole % CaF$_2$, 7 mole % Na$_2$O, 20 mole % B$_2$O$_3$, and 1 mole % CeO$_2$. The cladding material may also be a germanate glass.

Thus, according to the preferred embodiments of the present invention, wide band optical amplification over the 1400 nm–1530 nm wavelength band can be achieved utilizing Tm-doped germanate glass material.

It will be apparent to those of skill in the art that the inventive glasses may be used in applications other than Tm-doped amplifiers or lasers. For example, the high germania content makes the undoped glasses useful for photorefractive applications such as optically written gratings and waveguides. The material is also well-suited for use as a low phonon energy host for other rare earth ions such as, for example, Yb$^{3+}$, Er$^{3+}$, Nd$^{3+}$, and the like. Such doped materials may be useful in applications such as amplifiers, lasers, and broadband fluorescent light sources at wavelengths other than those acheivable with the Tm-doped glass.

Since each application has different requirements, compositional modifications may be made to the base glass for performance optimization. For example, SiO2 may be added to the base glass for applications involving rare earth or transition metal ions not sensitive to the phonon energy of the host. Likewise, B2O3 may be added to enhance the photosensitivity of photorefractive materials.

While the above provides a full and complete disclosure of the preferred embodiments of the present invention, various modifications, alternate constructions, and equivalents may be employed without departing from the scope of the invention. Therefore, the above description and illustration should not be construed as limiting the scope of the invention, which is defined by the appended claims.

We claim:

1. A composition, comprising:
   $GeO_2$ having a concentration of at least 20 mole percent;
   at least one alkaline earth metal halide, wherein the total alkaline earth metal halide concentration is between about 0.5 mole percent and about 10 mole percent;
   $Tm_2O_3$ having a concentration of about 0.001 mole percent to about 2 mole percent; and
   $Ga_2O_3$, having a conentration of about 2 mole percent to about 40 mole percent.

2. The composition according to claim 1, further comprising:
   an alkali metal compound selected from the group consisting of $Li_2O$, $Na_2O$, $K_2O$, $Rb_2O$, $Cs_2O$, $Li_2F_2$, $Na_2F_2$, $K_2F_2$, $Rb_2F_2$, $Cs_2F_2$, $Li_2Cl_2$, $Na_2Cl_2$, $K_2Cl_2$, $Rb_2Cl_2$, $Cs_2Cl_2$, $Li_2Br_2$, $Na_2Br_2$, $K_2Br_2$, $Rb_2Br_2$, $Cs_2Br_2$ and combinations thereof, and having a non-zero concentration of less than about 20 mole percent.

3. The composition according to claim 2, wherein a composition ratio $R_1$ is greater than or equal to 0.4 and less than or equal to 2.5, wherein $R_1$ is defined by the following relationship:

$$R_1=(AO+AX_2+Z_2O+Z_2X_2)/(Ga_2O_3+Al_2O_3),$$

where A is at least one alkaline earth metal, Z is at least one alkali metal, and X is at least one halide.

4. The composition according to claim 2, further comprising a third compound selected from the group consisting $Ta_2O_5$, having a concentration of less than about 15 mole percent, $Bi_2O_3$, having a concentration of less than about 50 mole percent, $Al_2O_3$, having a concentration of less than about 20 mole percent, PbO, having a concentration of less than about 50 mole percent, and combinations thereof.

5. The composition according to claim 4, wherein a composition ratio $R_1$ is greater than or equal to 0.4 and less than or equal to 2.5, wherein $R_1$ is defined by the following relationship:

$$R_1=(AO+AX_2+Z_2O+Z_2X_2)/(Ga_2O_3+Al_2O_3),$$

where A is at least one alkaline earth metal, Z is at least one alkali metal, and X is at least one halide.

6. The composition according to claim 2, wherein the composition has a composition ratio $R_1$ of about 0.8 to about 1.25, wherein $R_1$ is defined by the following relationship:

$$R_1=(AO+AX_2+Z_2O+Z_2X_2)/(Ga_2O_3+Al_2O_3),$$

where A is at least one alkaline earth metal, Z is at least one alkali metal, and X is at least one halide.

7. The composition according to claim 2, wherein the composition has a composition ratio $R_2$ of about 1.8 to about 2.25, wherein $R_2$ is defined by the following relationship:

$$R_2=(AO+AX_2)/(Z_2O+Z_2X_2),$$

where A is at least one alkaline earth metal, Z is at least one alkali metal, and X is at least one halide.

8. The composition according to claim 1, wherein:
   $GeO_2$ has a concentration of about 50 mole percent to about 90 mole percent;
   $Tm_2O_3$ has a concentration of about 0.001 mole percent to about 2 mole percent; and
   $Ga_2O_3$, has a concentration of about 2 mole percent to about 40 mole percent.

9. The composition according to claim 1, wherein the total alkaline earth metal halide concentration is about 2 mole percent.

10. The composition according to claim 9, wherein:
    $GeO_2$ has a concentration of about 60 mole percent;
    $Tm_2O_3$ has a concentration of about 0.5 weight percent;
    $Ga_2O_3$ has a concentration of about 10 mole percent to about 18 mole percent;
    and wherein the composition further comprises BaO having a concentration of about 18 mole percent to about 30 mole percent.

11. The composition according to claim 10, wherein a $Tm^{3+}$ emission characteristic of the composition is varied by selecting the composition ratio $R_1$, wherein $R_1$ is defined by the following relationship:

$$R_1=(AO+AX_2+Z_2O+Z_2X_2)/(Ga_2O_3+Al_2O_3),$$

where A is at least one alkaline earth metal, Z is at least one alkali metal, and X is at least one halide.

12. The composition according to claim 11, wherein $R_1$ is between 0.4 and 2.5.

13. A composition comprsing:
    $GeO_2$ having a concentration of about 65 mole percent to about 75 mole percent;
    $Tm_2O_3$ having a concentration of about 0.05 mole percent to about 0.1 mole percent;
    $Ga_2O_3$, having a concentration of about 10 mole percent to about 18 mole percent;
    BaO having a concentration of about 2 mole percent to about 7 mole percent;
    $CaF_2$ having a concentration of about 0.1 mole percent to about 10 mole percent;
    CaO having a concentration of about 4 mole percent to about 10 mole percent;
    $K_2O$ having a concentration of about 2 mole percent to about 6 mole percent;
    $Rb_2O$ having a concentration of about 2 mole percent to about 4 mole percent;
    $CeO_2$ having a non-zero concentration of less than about 2 mole percent; and
    $RE_2O_3$ having a concentration of less than about 10 mole percent, where RE is a rare earth element other than thulium.

14. An optical amplification device, comprising:
    a germanate glass material doped with $Tm^{3+}$ having a first surface configured to receive an optical signal having a wavelength of from about 1460 nm to about 1530 nm, and a second surface configured to output an amplified optical signal, wherein the germanate glass material comprises:
    $GeO_2$ having a concentration of at least 20 mole percent;
    $Tm_2O_3$ having a concentration of about 0.001 mole percent to about 2 mole percent;
    a compound selected from the group consisting of $Ga_2O_3$, having a concentration of about 2 mole percent to about 40 mole percent, $SiO_2$, having a non-zero concentration of less than about 40 mole percent, $Ta_2O_5$, having a non zero concentration of less than about 15 mole percent, $La_2O_3$, having a non zero concentration of less than about 15 mole percent, $Al_2O_3$, having a concentration of at least about 5 mole percent, and combinations thereof; and
    an alkaline earth metal compound selected from the group consisting of MgO, CaO, SrO, BaO, $BaF_2$, $MgF_2$, $CaF_2$, $SrF_2$, $BaCl_2$, $MgCl_2$, $CaCl_2$, $SrCl_2$, $BaBr_2$, $MgBr_2$, $CaBr_2$, $SrBr_2$, and combinations thereof, and having a non-zero concentration of less than about 40 mole percent.

15. The optical amplification device according to claim 14, wherein the germanate glass material doped with $Tm^{3+}$ further comprises an alkali metal compound selected from the group consisting of $Li_2O$, $Na_2O$, $K_2O$, $Rb_2O$, $Cs_2O$, $Li_2F_2$, $Na_2F_2$, $K_2F_2$, $Rb_2F_2$, $Cs_2F_2$, $Li_2Cl_2$, $Na_2Cl_2$, $K_2Cl_2$, $Rb_2Cl_2$, $Cs_2Cl_2$, $Li_2Br_2$, $Na_2Br_2$, $K_2Br_2$, $Rb_2Br_2$, $Cs_2Br_2$ and combinations thereof, having a concentration of about 2 mole percent to about 6 mole percent.

16. The optical amplification device according to claim 15, wherein the germanate glass material doped with $Tm^{3+}$ has an emission bandwidth that is varied based on the composition ratio $R_1$ being greater than or equal to 0.4 and less than or equal to 2.5, said emission bandwidth extending from about 1400 nm to about 1540 nm, wherein said emission bandwidth is measured as a full width at half maximum.

17. The optical amplification device according to claim 15, further comprising:
a pump source configured to output pump light, wherein a wavelength of the pump light corresponds to an absorption characteristic of the germanate glass material doped with $Tm^{3+}$ to produce a population in a $^3H_4$ excited state of $Tm^{3+}$.

18. The optical amplification device according to claim 14, wherein the germanate host material comprises:
$GeO_2$ having a concentration of about 65 mole percent to about 75 mole percent;
$Tm_2O_3$ having a concentration of about 0.05 mole percent to about 0.1 mole percent;
$Ga_2O_3$, having a concentration of about 10 mole percent to about 18 mole percent;
BaO having a concentration of about 2 mole percent to about 7 mole percent;
$CaF_2$ having a concentration of about 0.1 mole percent to about 10 mole percent;
CaO having a concentration of about 4 mole percent to about 10 mole percent;
$K_2O$ having a concentration of about 2 mole percent to about 6 mole percent;
$Rb_2O$ having a concentration of about 2 mole percent to about 4 mole percent; and
$CeO_2$ having a non-zero concentration of less than about 2 mole percent.

19. The optical amplification device according to claim 14, wherein the germanate glass material doped with $Tm^{3+}$ is a core for an optical amplifying fiber.

20. The optical amplification device of claim 14 wherein the germanate glass material includes
$GeO_2$ having a concentration of at least 20 mole percent;
$Tm_2O_3$ having a concentration of about 0.001 mole percent to about 2 mole percent; and
$Ga_2O_3$, having a concentration of about 2 mole percent to about 40 mole percent.

21. The optical amplification device ot claim 20 wherein the germanate glass material further includes at least one alkaline earth metal halide, wherein the total alkaline earth metal halide concentration is between about 0.5 mole percent and about 10 mole percent.

22. An optical fiber comprising a core and a cladding surrounding the core, the core comprising
$GeO_2$ having a concentration of at least 20 mole percent;
$Tm_2O_3$ having a concentration of about 0.001 mole percent to about 2 mole percent; and
$Ga_2O_3$, having a concentration of about 2 mole percent to about 40 mole percent.

23. The optical fiber of claim 22, wherein the core further includes at least one alkaline earth metal halide, wherein the total alkaline earth metal halide concentration is between about 0.5 mole percent and about 10 mole percent.

24. The optical fiber according to claim 22, wherein the core further comprises:
an alkali metal compound selected from the group consisting of $Li_2O$, $Na_2O$, $K_2O$, $Rb_2O$, $Cs_2O$, $Li_2F_2$, $Na_2F_2$, $K_2F_2$, $Rb_2F_2$, $Cs_2F_2$, $Li_2Cl_2$, $Na_2Cl_2$, $K_2Cl_2$, $Rb_2Cl_2$, $Cs_2Cl_2$, $Li_2Br_2$, $Na_2Br_2$, $K_2Br_2$, $Rb_2Br_2$, $Cs_2Br_2$ and combinations thereof, and having a non-zero concentration of less than about 20 mole percent.

25. The optical fiber according to claim 24, wherein a composition ratio $R_1$ of the core is greater than or equal to 0.4 and less than or equal to 2.5, where $R_1$ is defined by the following relationship:

$$R_1=(AO+AX_2+Z_2O+Z_2X_2)/(Ga_2O_3+Al_2O_3),$$

where A is at least one alkaline earth metal, Z is at least one alkali metal, and X is at least one halide.

26. The optical fiber according to claim 24, wherein the composition has a composition ratio $R_2$ of about 1.8 to about 2.25, wherein $R_2$ is defined by the following relationship:

$$R_2=(AO+AX_2)/(Z_2O+Z_2X_2),$$

where A is at least one alkaline earth metal, Z is at least one alkali metal, and X is at least one halide.

27. The composition according to claim 22, wherein the core further comprises a compound selected from the group consisting $Ta_2O_5$, having a concentration of less than about 15 mole percent, $Bi_2O_3$, having a concentration of less than about 50 mole percent, $Al_2O_3$, having a concentration of less than about 20 mole percent, PbO, having a concentration of less than about 50 mole percent, and combinations thereof.

28. The optical fiber according to claim 22, wherein the core includes:
$GeO_2$ having a concentration of about 50 mole percent to about 90 mole percent;
$Tm_2O_3$ having a concentration of about 0.001 mole percent to about 2 mole percent; and
$Ga_2O_3$, having a concentration of about 2 mole percent to about 40 mole percent.

29. The optical fiber of claim 22 wherein the core includes
$GeO_2$ having a concentration of about 65 mole percent to about 75 mole percent;
$Tm_2O_3$ having a concentration of about 0.05 mole percent to about 0.1 mole percent;
$Ga_2O_3$, having a concentration of about 10 mole percent to about 18 mole percent;
BaO having a concentration of about 2 mole percent to about 7 mole percent;
$CaF_2$ having a concentration of about 0.1 mole percent to about 10 mole percent;
CaO having a concentration of about 4 mole percent to about 10 mole percent;
$K_2O$ having a concentration of about 2 mole percent to about 6 mole percent;
$Rb_2O$ having a concentration of about 2 mole percent to about 4 mole percent;
$CeO_2$ having a non-zero concentration of less than about 2 mole percent; and
$RE_2O_3$ having a concentration of less than about 10 mole percent, where RE is a rare earth element other than thulium.

* * * * *